United States Patent [19]

Bernard

[11] 4,195,489
[45] Apr. 1, 1980

[54] PORTION CONTROLLED FROZEN FOOD

[75] Inventor: Vincent E. Bernard, Richardson, Tex.

[73] Assignee: The Jimmy Dean Meat Company, Dallas, Tex.

[21] Appl. No.: 832,240

[22] Filed: Sep. 12, 1977

Related U.S. Application Data

[60] Division of Ser. No. 633,481, Nov. 19, 1975, Pat. No. 4,060,998, which is a continuation-in-part of Ser. No. 526,146, Nov. 22, 1974, abandoned.

[51] Int. Cl.$^2$ ............................................. F25D 13/06
[52] U.S. Cl. .......................................... 62/63; 62/320; 83/326; 426/524
[58] Field of Search ........................... 62/320, 345, 63; 426/515–578, 524, 513, 646; 425/461, 289, 148, 316; 83/100, 408, 99, 326, 152

[56] References Cited

U.S. PATENT DOCUMENTS

| | | | |
|---|---|---|---|
| 534,106 | 2/1895 | Hueg | 251/353 X |
| 724,609 | 4/1903 | Peters | 425/289 |
| 3,088,354 | 5/1963 | Voorhees | 83/152 X |
| 3,387,689 | 8/1972 | Podebradsky | 426/646 X |
| 3,394,646 | 7/1968 | Cunningham et al. | 83/326 X |
| 3,436,927 | 4/1969 | Gruber | 62/320 X |
| 3,934,050 | 1/1976 | Hawkins | 426/516 X |

Primary Examiner—William E. Wayner
Assistant Examiner—William E. Tapolcai, Jr.
Attorney, Agent, or Firm—Richards, Harris & Medlock

[57] ABSTRACT

The specification discloses a system and process for producing discrete chilled products having preselected weights from a semi-fluid mixture. The semi-fluid mixture is pumped along a distribution path to an extrusion manifold which extrudes a continuous sheet of the mixture. The continuous sheet is directed through a chilling station where it is chilled and firmed such that the sheet maintains its extruded cross-sectional configuration. A plurality of slicers continuously slice the continuous sheet of material into continuous lengths. A cutter periodically severs the continuous lengths at predetermined intervals to provide a plurality of discrete products having predetermined weights. The pumping rate, rate of travel through the freezer and periodic severing of the continuous lengths may be selectively varied in order to maintain any desired weight of the discrete products. In an alternative embodiment, the continuous sheet of material is divided into discrete products by stamping the sheet with a plurality of cutters. In another embodiment, a rotatable cutting drum, having a plurality of equally spaced circumferential slicing disks and equally spaced longitudinal blades, severs the continuous sheet of material into discrete products.

8 Claims, 24 Drawing Figures

PORTION CONTROLLED FROZEN FOOD

CROSS-REFERENCE TO RELATED APPLICATIONS

This is a division of application Ser. No. 633,481, filed Nov. 19, 1975, now U.S. Pat. No. 4,060,998; which was a continuation-in-part of patent application Ser. No. 526,146, filed Nov. 22, 1974 entitled "PORTION CONTROLLED FROZEN FOOD", now abandoned.

FIELD OF THE INVENTION

This invention relates to the preparation of discrete frozen products, and more particularly relates to a system and method for producing frozen foods in individual discrete portions.

DESCRIPTION OF THE PRIOR ART

A wide variety of products, such as explosives, rubber devices, food products and building materials are commonly formed from a semi-fluid material. When the semi-fluid material is not sufficiently rigid to maintain its shape after extrusion, it has been heretofore quite difficult to form discrete products having a predetermined shape and having a desired weight. It has thus been common to prepare discrete products from semi-fluid material by filling individual containers or molds and then freezing or otherwise treating the individual containers. Such processes requiring the filling of individual containers have been found to be relatively slow and expensive.

With respect to food products, it has become desirable in the home, restaurants and other places to utilize food portioned in predetermined serving sizes or portions. For example, it has become desirable to provide serving portions of sausage such as a one-ounce sausage link or a two-ounce sausage patty. However, it has not heretofore been practical to provide such close controlled portion sizes of foods such as skinless pork sausage with conventional packaging techniques.

It has heretofore been known to produce skinless sausage of various types by stuffing comminuted meat into a casing, setting the meat by chilling or cooking and then stripping the casing from the meat. The requirement of stuffing the casing and then stripping the casing is time consuming and of course wasteful. It has also reportedly been heretofore attempted to extrude pork for various processing techniques, but the resulting friction along the sides of the extruding tube have caused fat to come to the surface of the pork, thereby producing a product which appears to consist of all fat or excessive fat, and it is therefore unpleasing to the consumer.

A need has thus developed for a system and process to enable the continuous forming of a plurality of discrete solid products from semi-fluid material. The system and process must not only be fast and cost effective, but must enable the formation of a plurality of different shapes and sizes of discrete products with very close weight tolerances.

SUMMARY OF THE INVENTION

The present invention has reduced or eliminated the problems associated with the prior art previously described. In accordance with the present invention, a plurality of discrete products having a predetermined weight may be formed by a system which pumps a semi-fluid mixture along a distribution path. An extrusion manifold receives the semi-fluid mixture and extrudes the mixture at a selected rate to form a continuous sheet of mixture having a predetermined uniform cross-section. A conveyor directs the continuous sheet through a chilling station in order to chill and firm the sheet such that the sheet maintains its extruded cross-sectional configuration. Structure severs the continuous sheet into a plurality of discrete products having predetermined weights.

In accordance with another aspect of the invention, a system is provided for forming a plurality of discrete products having preselected weights which includes a hopper for receiving a quantity of warm semi-fluid material. A pump pumps the material through a feed line at a selected rate and pressure. An extrusion manifold has an inlet connected at the end of the feed line and includes an outlet with a smaller dimension than the inlet. A flexible conduit extends from the manifold outlet and includes an end nozzle to form a continuous extruded sheet of material. A chilling chamber is mounted adjacent the end nozzle. A conveyor receives the continuous sheet from the end nozzle and carries the continuous sheet through the chilling chamber where it is chilled and firmed. A plurality of cutting disks are mounted at the outlet of the chilling chamber and continuously slice the sheet into continuous lengths of material. A cutting blade is movable in synchronism with the conveyor for severing the continuous lengths to form a plurality of discrete products having the selected weight.

In accordance with a more specific aspect of the invention, a cutting system is provided to periodically sever the sliced continuous lengths of material and includes structure for receiving a plurality of parallel lengths of material traveling in a direction parallel to the axes of the lengths. An elongated cutting blade is disposed above and normal to the direction of travel of the lengths of material. Structure moves the blade downwardly for simultaneously severing all of the lengths of material while moving the blade in the direction of travel of the lengths of material and at the same rate of speed as the lengths of material.

In accordance with another embodiment of the invention, a plurality of cutting molds are provided for stamping the continuous sheet as it is extruded from the end nozzle onto the conveyor to form a plurality of discrete products. Each cutting mold has a cutting edge for severing a predetermined shape of chilled mixture from the continuous sheet. A vacuum is drawn above the severed shapes of mixture to permit withdrawal of the severed shapes from the continuous sheet. A second conveyor is operable with the cutting molds whereupon the severed shapes of mixture are deposited and carried to a packaging station.

In accordance with still another embodiment of the invention, a rotatable drum is provided for severing the continuous sheet into predetermined discrete products. The drum is adapted with equally spaced sharpened circumferential blades for slicing the sheet into continuous lengths and sharpened longitudinal blades for severing the lengths to form the predetermined shapes from the chilled mixture. The drum is positioned to sever the continuous sheet by the action of the circumferential and longitudinal blades against the continuous sheet as it is moved on the conveyor. The drum is rotated so that the circumferential blades move at the same speed of travel as the linear conveyor on which the continuous sheet moves. The linear conveyor is adapted with indentions for receiving the sharpened edges of the circumferential and longitudinal blades to facilitate cutting of the continuous sheet.

In accordance with yet another aspect of the invention, a process for producing pork sausage includes boning warm prerigor pork. The boned pork is then comminuted to form a semifluid mixture which is pumped to an extrusion location. The semi-fluid mixture is then extruded into a continuous sheet having uniform cross-sections. The extruded continuous sheet is chilled such that it maintains the desired cross-sectional configuration. The sheet is periodically severed to form a plurality of chilled discrete sausage portions having the same weight and consistency.

DESCRIPTION OF THE DRAWINGS

For a more detailed description of the present invention and for further objects and advantages thereof, reference is now made to the following description, taken in conjunction with the accompanying drawings, in which.

DESCRIPTION OF THE PREFERRED EMBODIMENT

Figure 1:
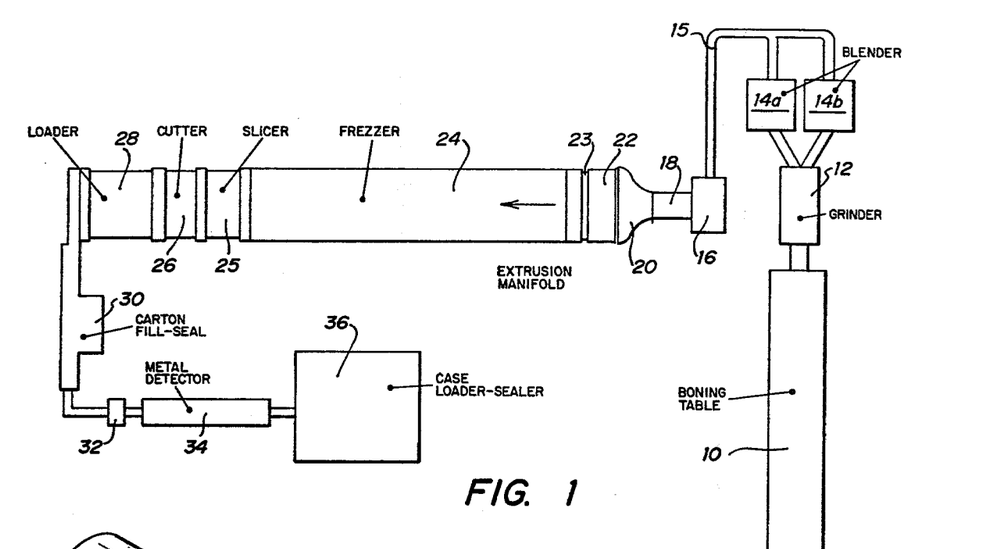
FIG. 1 is a block diagram of the present portion controlled forming system.

FIG. 1 is a top flow plan illustrating the use of the present product forming invention to make fresh pork sausage. It has been found that the present invention is particularly adaptable to making fresh pork sausage and a detailed description of the invention will be made with respect to production of pork sausage from warm semi-fluid pre-rigor pork. However, it will be apparent that the present invention may also be utilized to form discrete products from other semi-fluid materials. For the purposes of this invention, the term semi-fluid is defined as material which is pumpable through conduits. The present system may thus be utilized to extrude hot or chilled ground meat, or other types of pumpable material.

Referring to FIG. 1, freshly killed hogs are dressed, skinned and cut shortly after slaughter. The still warm pre-rigor pork is cut on a boning table 10 and all cuts including the ham, loins and the like of the hogs are utilized in making the sausage. The hot boned meat coming off the boning table 10 is fed into a grinder 12 and is checked for fat content to maintain the fat content at 35%. A fat analysis unit, not shown, is maintained near the grinder 12 in order to make rapid fat checks regarding the fat content of the sausage being ground. The output of the grinder 12 is applied to two blenders 14a and 14b which form the sausage into a semi-fluid fluent material which will not retain its shape after being extruded.

In the preferred embodiment of the invention, it is necessary that the hogs be boned and ground within about four hours from slaughter before rigor mortis, and the temperatures of the boned meat be maintained at as near body temperature as possible, and at any rate above 80° F., such that the rended pork output from the blenders 14a and 14b is semi-fluid so as to freely flow. The process should be carried out in a room having an ambient temperature of not under 50° F. In the preferred embodiment, it is preferable to bone, grind, chill and sever the pork sausage within 90 minutes after slaughter. Alternatively, the present system may utilize chilled raw material which becomes semi-fluid after blending in the blenders 14a and 14b.

In the preferred embodiment, the blenders 14a and 14b may comprise, for example, two 3,000 pound Rietz blenders. The semi-fluid material output from the blenders moves through conduit 15 and is applied through a pump 16, which may comprise, for example, an auger feed pump including a de-aerating head. Pump 16 applies semi-fluid pork sausage through a distribution line 18 at a predetermined flow rate to an extrusion manifold 20. Although only a single manifold 20 is illustrated, it will be understood that two or more manifolds may be utilized, depending upon the desired quantity of material to be handled. The manifold 20 extrudes a continuous sheet of semi-fluid material which is applied through flexible conduit 22.

Flexible conduit 22 includes a nozzle on the end thereof to form and extrude a continuous sheet 23 of pork sausage having a predetermined uniform cross-section, the continuous sheet being moved through a freezer 24. The continuous sheet moves at 15-feet per minute through freezer 24, whereupon the continuous sheet is quickly chilled to an extent that it maintains its extruded cross-sectional shape. Freezer 24 may comprise any suitable type of freezer, but in the preferred embodiment comprises a liquid nitrogen freezer such as the Cyro-Quick freezer manufactured and sold by Air Products Corporation. In some cases, it may be desirable to spray a refrigerant such as nitrogen or fluorocarbon upon the sausage or on the underside of the moving conveyor belt in order to quickly chill the sausage.

The chilled pork sausage exits freezer 24 at an internal temperature of −10° F. The chilled sausage is continuously sliced into equal width continuous lengths by a slicer 25 and periodically severed into desired lengths by a cutter 26 to form a plurality of discrete sausage products each having a predetermined weight and volume. For example, the width and length of the final product may be controlled to produce a product having a weight of one-ounce. Sausage patties may be produced by the system having a weight of from 1½ to 5-ounces. If desired, the present device may be utilized to produce square sausage patties having any desired width to generate a specific weight. An important aspect of the present invention is that a very high degree of portion control may be achieved by the present system to provide products of uniform size, shape and weight. The emulsion density, emulsion flow speed, freezer belt speed, the slicer operation and cutoff blade operation may be varied in order to maintain the exact desired weight, or to change to a different desired weight or size. If desired, the width of one of the continuous lengths may be increased in order to produce one lane of heavier lengths which may then be used to increase the weight of light sausage packages.

The severed sausages formed by the cutter 26 unit are applied to a loader 28 which accumulates predetermined numbers of sausages and applies them to a fill and seal station 30. The station 30 fills cartons with predetermined numbers of frozen sausages and seals the cartons. The cartons are then directed to a weighing station 32 and then to a metal detector station 34. A plurality of cartons are loaded into cases at stations 36 and the cases are then sealed for transport.

The present hot molding process, in combination with the present extrusion system, enables the production of packages of frozen pork lengths or sausage patties within 70 to 90 minutes after live hogs enter the restrainer in the slaughtering department. The present system can thus produce over 3,000 pounds an hour of sausage in a nonstop process which requires only a few workers for maintaining operation of the machine. With the addition of additional extruders, greater yields may, of course, be provided.

The present process is extremely economical, in that no storage space is necessary, as the sausages may be packaged and loaded onto a truck within several hours of the time the hogs are slaughtered. The present system is extremely accurate in the control of portions, as sixteen one-ounce lengths may be packaged to a package to provide a very close tolerance to a one-pound meat package. The present system provides very low waste, as there is no discard of bits and pieces, which occurs with prior techniques. The present system provides an increased yield, as the meat is not continuously handled after slaughter.

Figure 2:
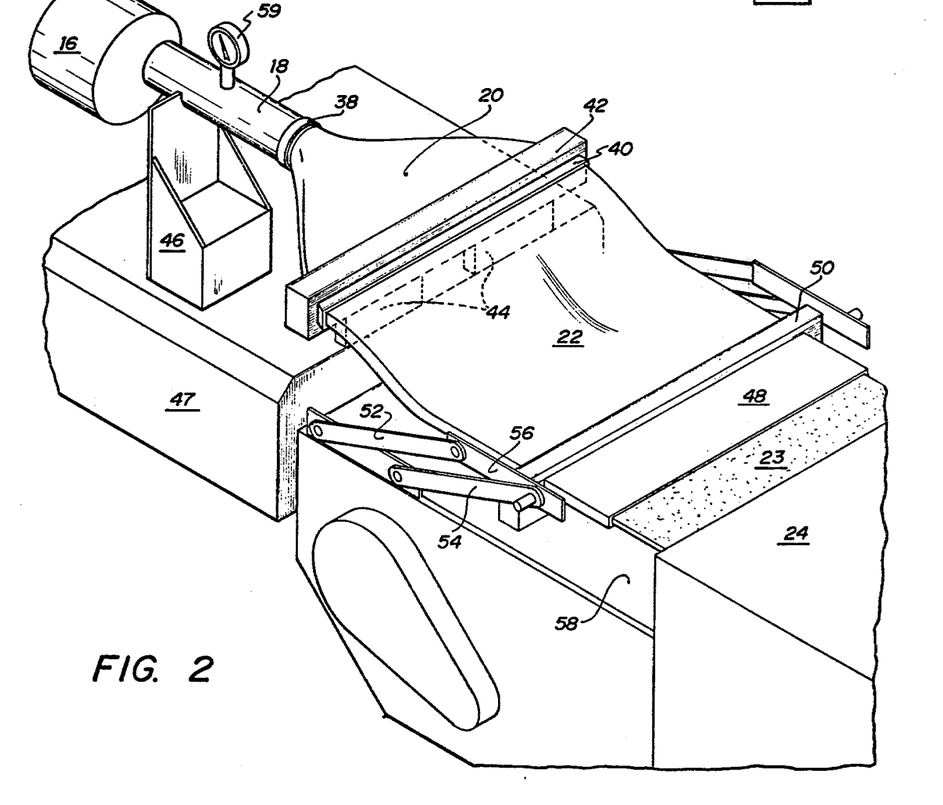
FIG. 2 is a perspective view of the extruding portion of the system.

FIG. 2 illustrates in detail the extrusion system of the invention. The semi-fluid sausage material is applied from pump 16 through the distribution line 18 to extrusion manifold 20. The extrusion manifold has a generally conical configuration at inlet 38 connected to distribution line 18. The manifold gradually flattens to a rectangular outlet 40 which is joined to flexible conduit 22 having an identical rectangular configuration for maintaining the semi-fluid material in the shape generated by passage of the fluid through the extrusion manifold. The cross-sectional area of the rectangular outlet of extrusion manifold 20 is slightly smaller than that of the inlet end 38 connected to distribution line 18. In this way, a rectangular sheet 23 of semi-fluid material extruded from manifold 20 is continuous without voids which would otherwise occur.

A metering pump 42 is interconnected between extrusion manifold 20 and flexible conduit 22 and is mounted on support brackets 44. Metering pump 42 maintains the flow rate of material from extrusion manifold 20 into conduit 22. Extrusion manifold 20 is supported by support 46. A base 47 supports the support 46 and support brackets 44. Base 47 includes the drive motor (not shown) for the metering pump 42.

An extrusion nozzle 48 is attached to the outlet end of conduit 22 and is received in a nozzle support housing 50. Nozzle support housing 50 is mounted on a parallelogram linkage including arms 52 and 54 which are pivotally joined by the horizontal bars 56. The parallelogram linkage may be moved from the illustrated lower position to an upper position, to be subsequently described, in order to move nozzle 48 into and out of contact with a material conveyor 58. Conveyor 58 comprises a metal mesh conveyor belt which conveys the extruded semi-fluid material into nitrogen freezer 24.

FIG. 2 further illustrates the pump of the present extruder. Semi-fluid material is applied through a conduit 15 from the blenders 14a and 14b (FIG. 1) to pump 16. Pump 16 may comprise any suitable type of pump, such as a Crepaco auger feed pump with a de-aerating head, which may be operated to force the semi-fluid material through the distribution line 18 at a prescribed flow rate. A pressure gauge 59 communicates with the distribution line 18 in order to enable pump 16 to be manually adjusted to maintain the desired pressure and flow rate. Semi-fluid material flows through the distribution line 18 to extrusion manifold 20 in the manner previously described.

As previously described, rectangular outlet 40 is smaller in diameter than inlet 38 to the manifold 20. Outlet 40 is connected to flexible conduit 22 which leads to metering pump 42. Pump 16, distribution line 18, extrusion manifold 20 and pump 42 are preferably comprised of stainless steel for cleanliness of operation. Metering pump 42 is commonly driven from a DC motor (not shown). The metering pump operates to provide equal pressure, flow rate speed and consistency of the semi-fluid material across extrusion nozzle 48. The head pressure applied to metering pump 42 is greater than the output from the pump in order to enable constant extrusion and to enable control of the density and weight of the resulting emulsion extruded. For example, the head pressure applied to pump 42 may be 40 PSI, with the output pressure from the pump being 10 PSI. Nozzle 48 is particularly designed to provide even extrusion distribution and to prevent uneven density throughout the extruded product.

Figures 3, 4, 5, 6:
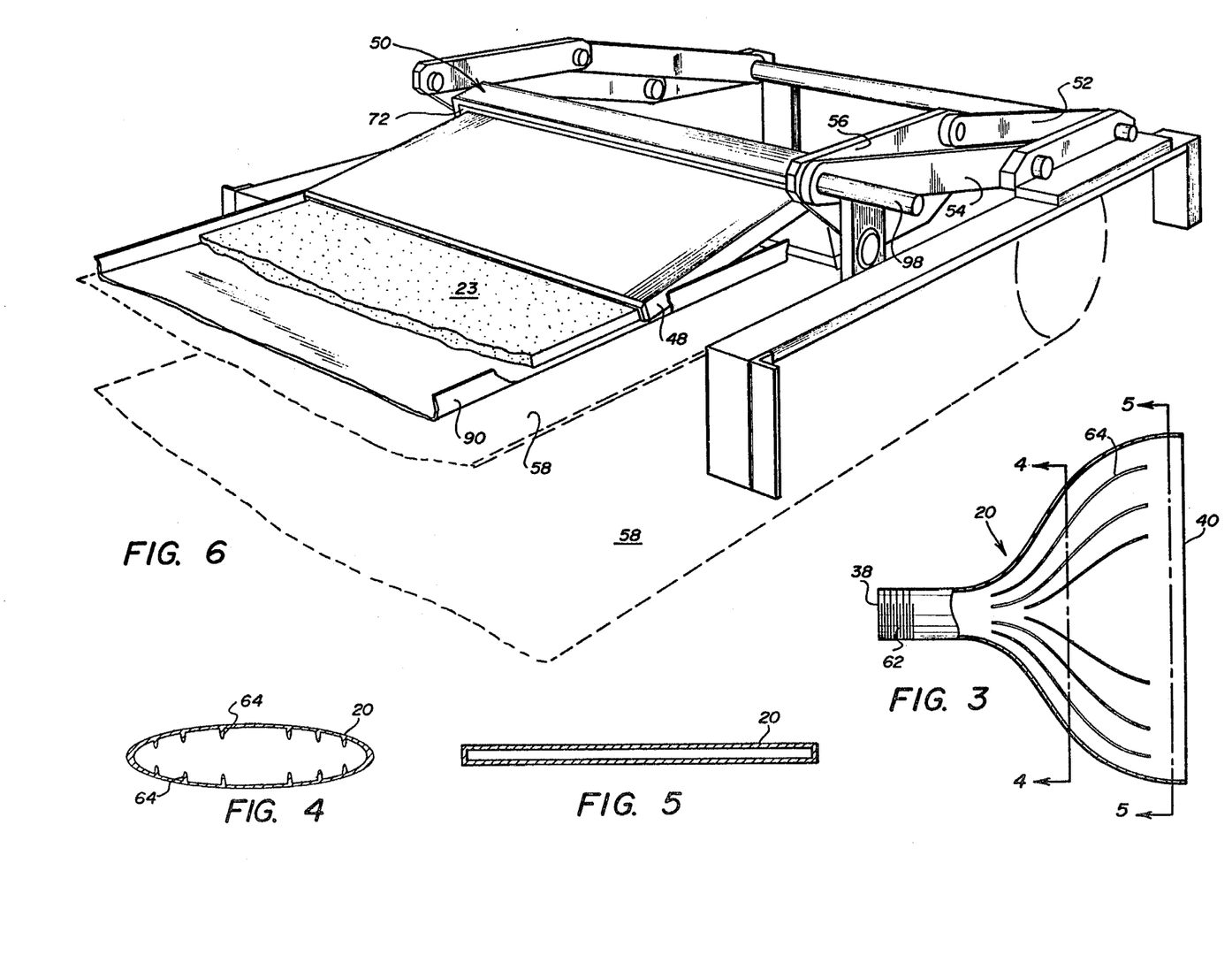
FIG. 3 is a partially broken away view of the extrusion manifold of the invention.
FIG. 4 is a sectional view of the extrusion manifold shown in FIG. 3 taken along line 4—4.
FIG. 5 is a sectional view of the extrusion manifold shown in FIG. 3 taken along line 5—5.
FIG. 6 is a perspective, partially broken away view of the extrusion nozzle assembly of the invention.

FIG. 3 illustrates in greater detail extrusion manifold 20 used to mold the semi-fluid material from the configuration defined by distribution line 18 to the continuous rectangular sheet of material extruded from outlet 40 of the manifold. Manifold 20 is provided with a generally conical cross-sectional configuration at inlet 38. Inlet 38 includes thread 62 for threadedly receiving distribution line 18. The conical end of manifold 20 gradually flattens to become rectangular outlet 40 opposite inlet 38. As previously noted, outlet 40 is connected to flexible conduit 22 by way of metering pump 42 as shown in FIG. 2.

Referring to FIG. 3, guide ribs 64 are provided on the inner surface of manifold 20 to guide the sausage material evenly from inlet 38 to rectangular outlet 40 opposite thereto. These ribs assure the movement of the semi-fluid material to the full length of rectangular outlet 40 of the manifold and eliminate any voids which might otherwise result from the passage of the material through the manifold.

FIG. 4 shows a sectional view of manifold 20 in the intermediate transition area between inlet 38 and outlet 40. Ribs 64 are shown extending from both the upper and lower walls of the manifold.

FIG. 5 illustrates the configuration of the extrusion manifold near outlet 40. At this point, ribs 64 are tapered away so as not to interfere with the rectangular configuration discharged from the manifold. Thus, as the semi-fluid material passes out of the manifold, it takes the form of a relatively thin evenly distributed rectangular sheet of material.

FIG. 6 illustrates extrusion nozzle 48 which forms the continuous sheet of semi-fluid material to be delivered into freezer 24. Flexible conduit 22 has been eliminated from FIG. 6 for clarity of illustration. Referring to FIG. 6, it will be seen that nozzle 48 slants downwardly toward the metal mesh, endless belt conveyor 58 which travels into freezer 24. Nozzle 48 is removably mounted in a housing 72, mounted on rod 74 (FIG. 7) to form the previously described nozzle support housing 50.

Figure 7:
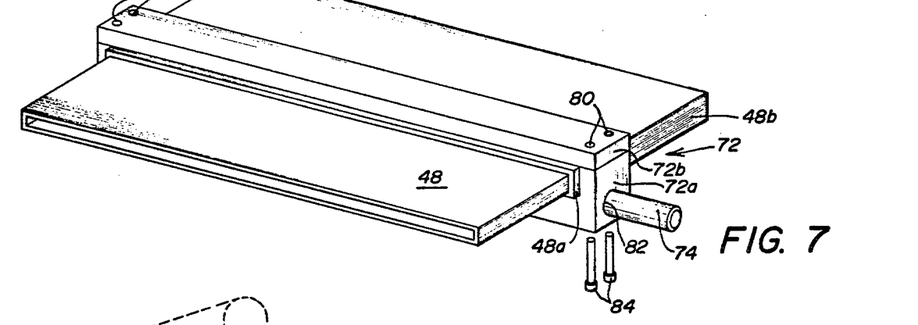
FIG. 7 is a perspective enlarged view of the nozzle connections assembly.
Figure 8:
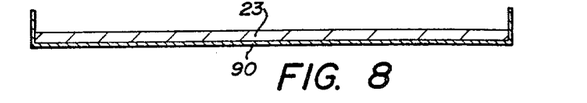
FIG. 8 is a sectional view of the extrusion material form shown in FIG. 6 with a continuous sausage sheet disposed therein.

FIG. 7 illustrates in greater detail the interconnection of nozzle 48 to rod 74. Rod 74 extends horizontally across the belt conveyor 58 and is attached at opposite ends to the parallel linkages comprising arms 52, 54 and bar 56 (FIG. 6) previously described. Housing 72 is rigidly mounted along the rod 74.

Housing 72 includes two mating sections 72a and 72b interconnected by suitable means such as bolts 80. The lower section 72a of housing 72 is provided with a rectangular cutout along its entire upper length for receiving nozzle 48 therein. Nozzle 48 includes an enlarged front portion 48a for abutting with the front edge of lower section 72a and upper section 72b. Nozzle 48 includes a rearwardly extending portion 48b for connection to flexible conduit 22. This rearwardly extending portion also includes an enlarged section in order to facilitate a fluid-tight connection to the flexible conduit. Therefore, by positioning nozzle 48 within the rectangular cutout of housing 72 and assembling the upper section 72b thereabove, nozzle 48 is securely attached within housing 72.

Lower section 72a is further adapted with a circular bore 82 extending along its entire longitudinal length and below the rectangular cutout provided for nozzle 48. Bore 82 is adapted to receive rod 74 into frictional engagement. In addition thereto, set screws 84 may be provided for insertion through the lower side of housing 72 to engage rod 74 to maintain rod 74 fixed within housing 72 during operation.

When it is desired to clean the system, the upper portion of housing 72 is simply removed by removing bolts 80 and releasing nozzle 48 for cleaning. All of the elements shown in FIG. 7 are made of stainless steel to facilitate cleaning.

As shown in FIG. 6, in operation of the invention, continuous sheet 23 of semi-fluid material is extruded from nozzle 48. A stainless steel extrusion form 90 may be attached to conveyor 58 in order to guide continuous sheet 23 into the freezer while maintaining the sheet in the configuration in which it is extruded. Form 90 has a flat lower surface 90a and upright side members 90b to prevent the semi-fluid material from spreading out of its extruded configuration prior to chilling. Form 90 also facilitates the subsequent step of slicing the material as will hereinafter be described.

Alternatively, conveyor 58 may be adapted with vertical side members corresponding to the edges of the extruded continuous sheet of material. In this embodiment, the extruded material is deposited directly on the belt conveyor and carried into freezer 24.

Referring to FIG. 6, conveyor 58 is moving at the same speed as continuous sheet 23 is being extruded or in the preferred embodiment, at approximately 15 feet per minute. Similarly, form 90, where used, moves at the same speed as belt conveyor 58. The extruded continuous sheet 23 is promptly moved by conveyor belt 58 into the nitrogen freezer 24 (FIG. 1) whereupon the continuous sheet is immediately chilled to an extent that it maintains its cross-sectional shape. The present process is carried out in a room having an ambient room temperature of approximately 50° F. The freezer is provided with a temperature of approximately −170° F. in order to chill the interior of continuous sheet 23 to approximately −10° F. Nitrogen or fluorocarbon liquid may be sprayed on the sausage or underneath the conveyor in order to quickly chill the sausage.

Figure 9:
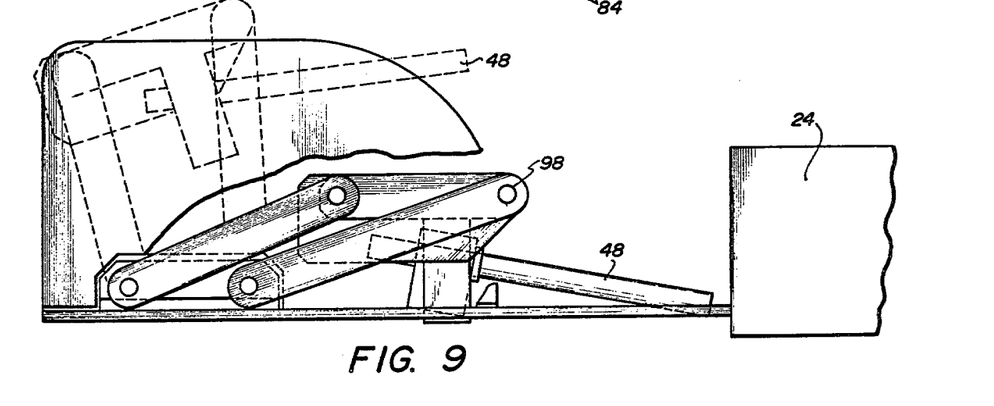
FIG. 9 is a side view of the parallelogram lift linkage for the nozzle assembly.

When the system is initially turned on for operation, continuous sheet 23 initially extruded may not be of a desired consistency or at the desired flow rate. Thus, a handle 98 is provided on the parallelogram linkage comprised of arms 52, 54 and bar 56 in order to enable nozzle 48 to be raised away from contact with conveyor 58. Referring to FIG. 9, the dotted line position illustrates the upward position of nozzle 48 when in the raised position. In this position, the extruded material may be extruded into a dump bucket (not shown), until the material reaches the desired consistency or flow rate. At such time, the dump bucket may be removed and the parallelogram linkage moved downwardly by grasping handle 98 and pushing downwardly until nozzle 48 is again oriented at the desired angle to the conveyor as shown in FIG. 6.

Figure 10:
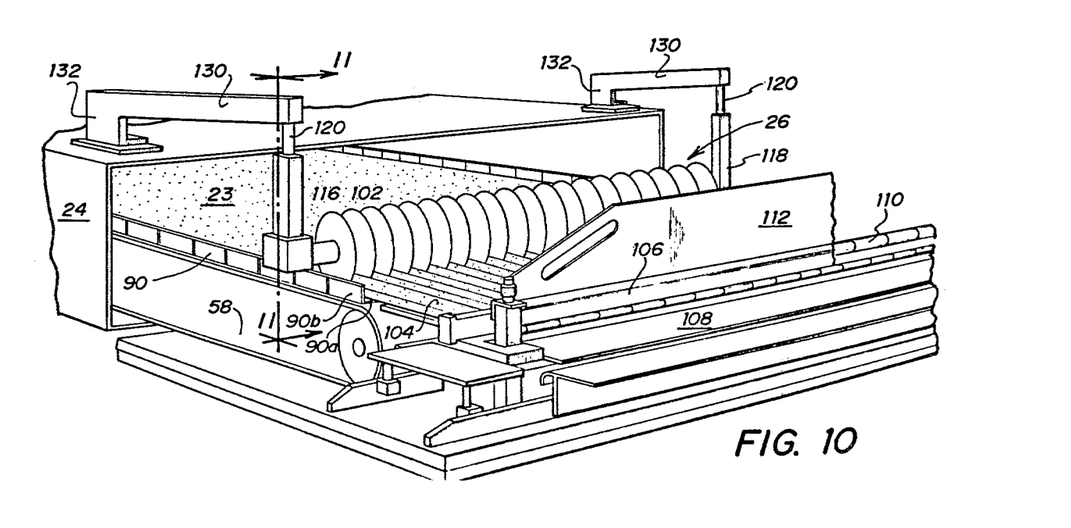
FIG. 10 is a perspective view of the slicing disks of the invention.

Referring to FIG. 10, slicer 25 and cutter unit 26 of the invention are illustrated in detail. As previously noted, cutter unit 26 is located at the output of freezer 24 which delivers the continuous sheet 23 of chilled pork sausage to the cutter unit. Chilled sheet 23 is directed to extrusion form 90 which includes base 90a and vertical sides 90b corresponding to the width of the continuous sheet. The sheet is thus guided past a plurality of vertically suspended rotatable cutting disks 102 where the sheet is sliced into a plurality of equal width continuous lengths 104 of chilled material. Lengths 104 are then carried by conveyor 58 to an elongated vertical knife blade 106 which is reciprocated in a manner to be subsequently described in synchronism with a horizontal bed 108. A hold-down roller 110 is disposed in front of blade 106 in order to hold the continuous links down during the severing operation by knife blade 106. A back board 112 is disposed over blade 106.

Figure 11:
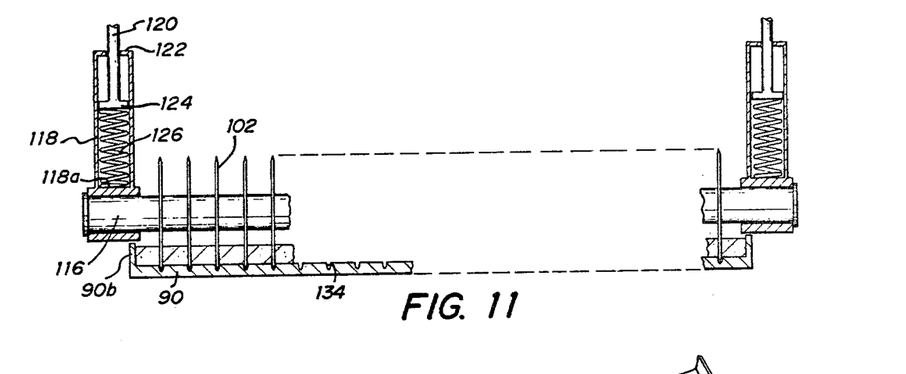
FIG. 11 is a sectional view taken along line 11—11 of FIG. 10.

As indicated above, slicing of the continuous sheet 23 into a plurality of equal width continuous lengths 104 is accomplished by the action of rotatable cutting disks 102. As shown in FIG. 11, disks 102 are rotatably assembled along horizontal bar 116. The ends of bar 116 are fixedly supported by a sleeve support member 118 which slidingly engages upper rod 120. Sleeve member 118 is adapted with a collar 122 and rod 120 is adapted with a corresponding flange 124 to permit limited translation of sleeve 118 along rod 120. A compression spring 126 is assembled between the lower end of rod 120 and a seat 118a provided at the lower end of sleeve support member 118. Compression spring 126 acts against rod 120 to apply a downward force upon rod bar 116 and thus engage cutting disks 102 against the chilled sausage material passing below disk 102. Rod 120 is rigidly supported from arms 130 which extend from a suitable frame structure 132. An identical connection exists between bar 116 and frame structure 132 on the opposite end of bar 116. In this way, the cutting disks 102 are kept in proper slicing engagement against the chilled sausage material moving on conveyor 58.

As is seen in FIG. 11, form 90 is adapted with longitudinal indentions 134 which correspond with the cutting edge of cutting disk 102. These small indentions facilitate severing of the chilled sausage material into continuous lengths. Vertical sides 90b of form 90 can also be seen to prohibit the lateral flow of sausage material during cutting. FIG. 11 further illustrates the action of compression springs 126 against bar 116 in order to engage cutting disks 102 against the sausage material. Likewise, the compression springs may be adapted with an adjustment for selectively increasing or decreasing the force applied to cutting disks 102 as necessary to effect a proper cut.

Figure 12:
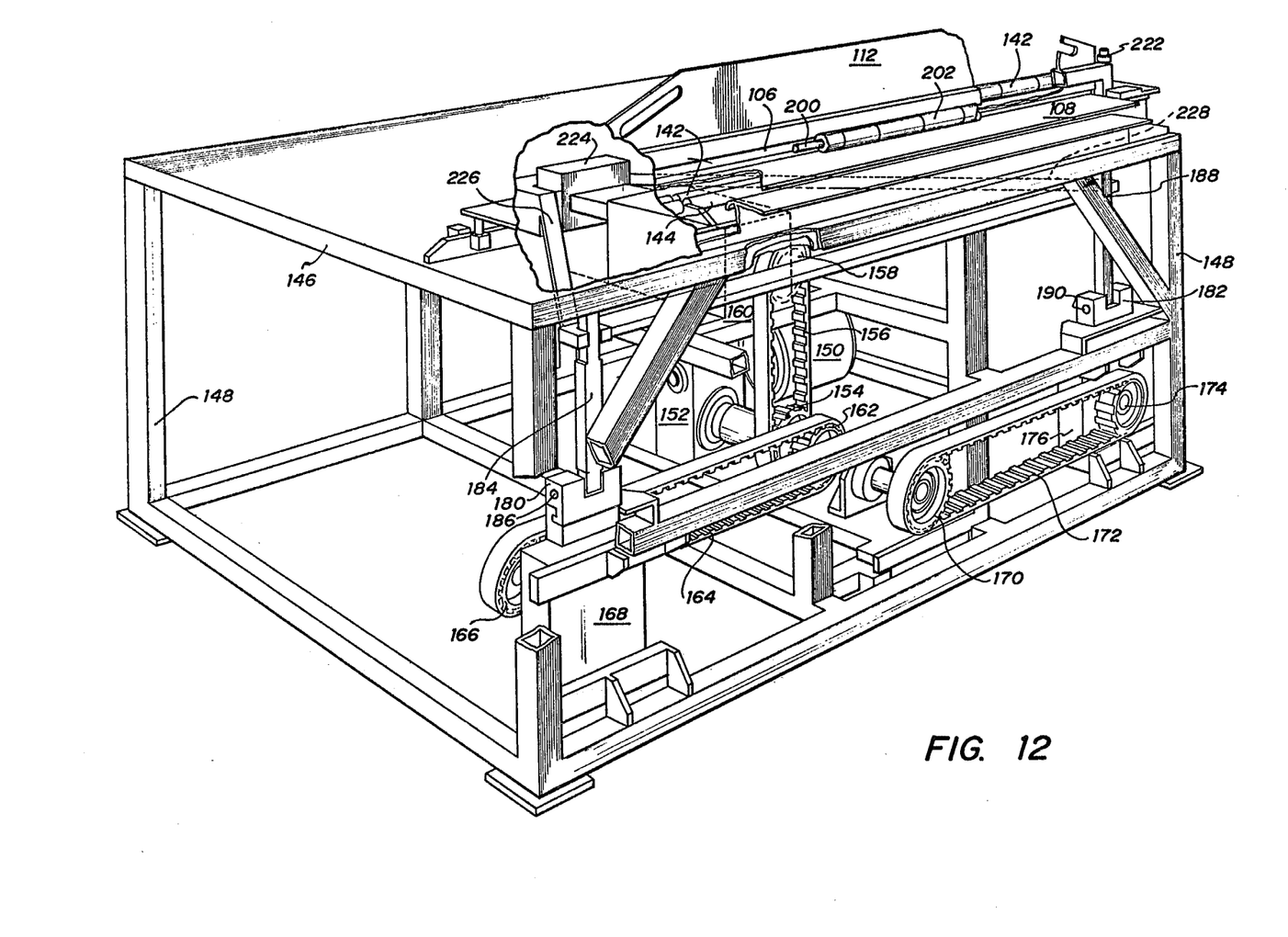
FIG. 12 is a perspective, partially broken away view of the cutting table of the invention.

Referring to FIG. 12, bed 108 reciprocates in a horizontal plane over rollers 142 and 144. The cutting assembly is mounted on a horizontal platform 146 supported by legs 148. The reciprocating movement of knife blade 106 and bed 108 is provided by an electrical motor 150 which operates a drive motor 152. The output shaft of motor 152 rotates a gear 154 which operates a timing belt 156. Belt 156 operates a gear 158 of a linear displacement cam 160.

The output shaft of the motor 152 also rotates a gear 162 which operates a timing belt 164. Belt 164 rotates a gear 166 attached to a second linear displacement cam 168. The output of motor 152 also rotates a gear 170 which moves a timing belt 172 which rotates a gear 174 of a third linear displacement cam 176. The three linear displacement cams 160, 168 and 176 operate in the known manner to translate rotary motion to linear motion. Suitable linear displacement cams are manufactured and sold by the Stelron Corporation.

A block 180 is mounted above the linear displacement cam 168, while a block 182 is mounted above the cam 176. A vertical post 184 is pivotally mounted at pivot point 186 to block 180. Similarly, a vertical post 188 is pivotally mounted at pivot point 190 to block 182. The tops of posts 184 and 188 are connected to blade 106. Operation of the linear displacement cams 168 and 176 thus serve to provide vertical movement to blade 106. Operation of the linear displacement cam 160 operates to provide horizontal reciprocational movement to the cutting blade 106 and bed 108.

The back board 112 is shown interconnected with knife blade 106. Posts 188 and 184 operate to provide vertical movement to knife blade 106 in order to sever the continuous lengths of sausage in the manner to be subsequently described. The bed 108 rides upon rollers 142 and 144 in the manner previously described. A rod 200 includes a plurality of rollers 202 thereon in order to hold the continuous lengths down during the cutting operation.

As previously noted, the linear displacement cams 168 and 176 operate to cause reciprocating vertical motion to the posts 184 and 188. Knife blade 106 is attached to the top of posts 184 and 188 by bolts 220 (not shown) and 222 such that blade 106 is moved up and down in order to cut the continuous lengths. Inasmuch as the continuous lengths are traveling perpendicular to the orientation of blade 106, blade 106 cuts each of the continuous lengths simultaneously.

Linear displacement cam 160 reciprocates a block 224 in a horizontal plane. Block 224 is attached by arms 226 and 228 to posts 184 and 188. Thus, arms 226 and 228 are moved horizontally, thereby causing the posts 184 and 188 to pivot about pivot points 186 and 190. The posts 184 and 188 thus swing back and forth in a limited arc in order to move knife blade 106 in a horizontal plane. This mechanism also causes the movement of the bed 108 on a horizontal plane.

It will be seen from FIG. 12 that the posts 184 and 188 and the arms 226 and 228 may be selectively adjusted to any of several desired positions in order to allow the movement of blade 106 and bed 108 to be selectively adjusted. In this manner, the length of cuts made by the cutting blade may be selectively adjusted in order to enable the weight of the final discrete product to be selectively adjusted.

Figure 13A:
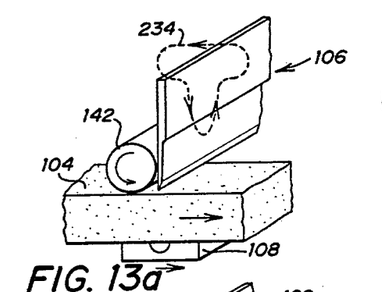
FIGS. 13a–13d illustrate the cutting operation of the blade and bed of the cutting table.

FIGS. 13a-13d illustrate the cutting operation of blade 106 and bed 108. Referring to FIG. 13a, blade 106 is shown in its initial starting position just behind roller 142 which operates to maintain continuous length 104 against bed 108. During operation of the device, knife blade 106 covers a reciprocating path indicated by the dotted line 234. That is, knife 106 moves along with length 104 for a short distance and is then moved downwardly in order to sever length 104. Subsequently, knife blade 106 is moved upwardly and is then raised and moved to the original starting position shown in FIG. 13a. Roller 142 rotates in the direction illustrated during operation of blade 106.

Figure 13B:
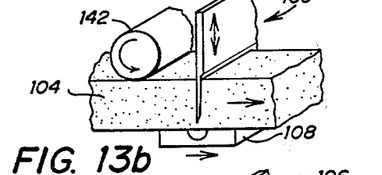

FIG. 13b illustrates how the knife blade 106 has been moved to the right in synchronism with movement of bed 108 and then moves downwardly in order to sever length 104. Inasmuch as blade 106 and bed 108 are traveling at the same rate as the length 104, the lengths do not have to be stopped to enable severing thereof.

Figures 13C, 13D, 15:
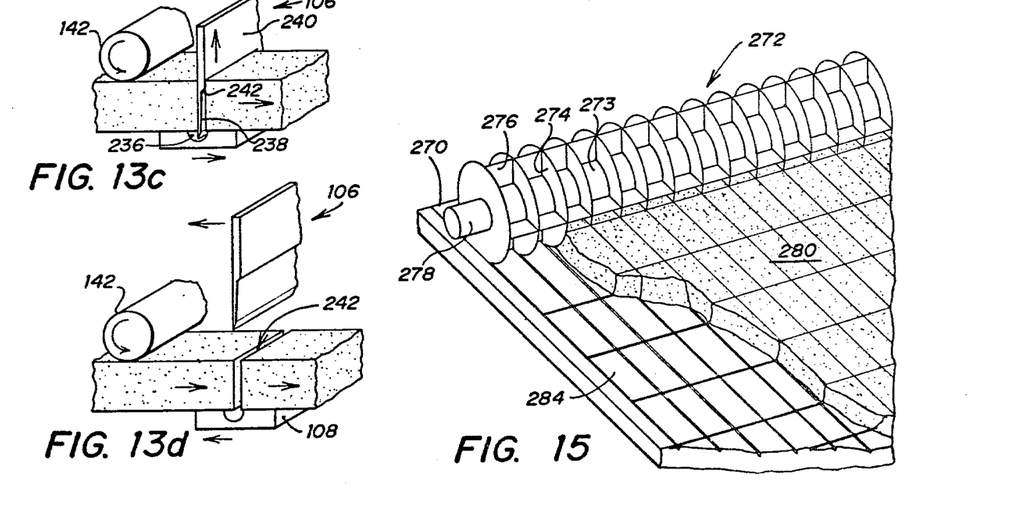
FIG. 15 is a perspective view of a second embodiment of a cutting device for use with the present invention.

FIG. 13c illustrates the final severing of length 104. As shown in FIG. 13c, bed 108 includes a depression 236 which receives the foremost edge of blade 106 in order to insure that the blade passes completely through length 104. Moreover, FIG. 13c illustrates the particular shape of knife blade 106. The lower-most portion 238 of the blade is relatively narrow and is maintained with a very sharp lower point. The upper portion 240 of the blade is wider than the lower portion. The two portions are separated by a beveled portion 242. The lower portion 238 is thus utilized to make the initial cut through length 104. The upper and wider portion 242 acts to push the severed portion of length 104 away from the uncut portion, and thus tends to break and completely sever any fibers which would tend to prevent clean cutting.

After the blade has made its downward descent as shown in FIG. 13c, the blade is raised while still traveling in the direction and at the same rate as length 104 until it reaches the position shown in FIG. 13d. At this position, blade 106 and bed 108 change horizontal direction as shown by arrow 246 (FIG. 13d) and move back to the original starting point as shown in FIG. 13a. Continuous length 104 has thus been severed by the knife blade 106. The blade 106 is continuously moved in the path shown by the dotted line 234 in order to periodically cut off identical lengths of product. In this way, products of exact weight, volume and consistency may be maintained. If desired, the volume, consistency, flow rate or length of cutting path of blade 106 may be varied in order to change the volume or weight or consistency of the final product. For a more detailed description of the operation of knife blade 106 and bed 108, during severing of continuous length 104, reference can be made to copending application, Ser. No. 610,301, filed Sept. 4, 1975, which is incorporated herein by reference.

Figure 14:
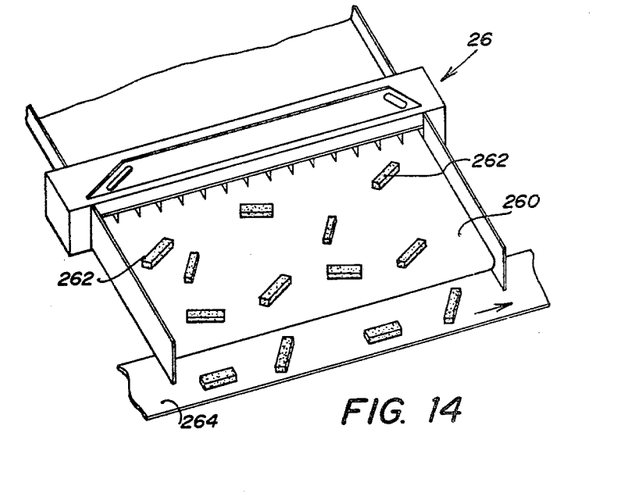
FIG. 14 is a perspective view of the outlet of the cutting table.

FIG. 14 illustrates the output at cutter unit 26 which operates in the manner previously described. A downwardly sloping dispensing surface 260 extends from the output of the cutter unit and a plurality of discrete sausage lengths 262 may be seen to be dispensed from cutter unit 26. The products 262 roll and slide downwardly to a conveyor 264 whereupon products are conveyed to loading station 28.

As previously noted, a particular advantage to the present invention is that very accurate portion control may be provided for the present products. Thus, each of the products 262 may be formed with the same volume and size and weight so that a discrete number of the products may be packaged in individual cartons. For example, each of the products 262 may be cut in weigh one-ounce, and thus sixteen one-ounce products may be packaged together to provide a one-pound package. With the use of the present invention, a very accurate weight is maintained with each product. However, if the weight is desired to be changed, the system may be easily varied to change the weight. The product 262 is already frozen when packaged, and thus additional hard freezing is not required after packing.

FIG. 15 illustrates another embodiment of the cutter unit. A continuous sheet 270, having a rectangular cross-section, is illustrated as having been extruded and then chilled as previously described. The sheet is applied through a cutting station which includes a rotating cutting drum 272 including a cylindrical drum 273 having a plurality of slicing disks 274 equally spaced along a longitudinal length thereof and a plurality of equally spaced cutting blades 276 along the longitudinal length thereof. The cutting drum 272 is rotatably supported on axis rod 278 which is supported in a fashion similar to the support and spring structure defined with respect to the cutting disks illustrate and described with respect to FIG. 10. Thus, cutting drum 272 is engaged against the continuous sheet of chilled material which passes beneath the cutting drum as it is carried by the belt conveyor 58. The pressure of the cutting drum against the sheet of chilled material results in the severing of a plurality of rectangular products 280 which are then carried on the conveyor to a packaging station.

Figure 16:
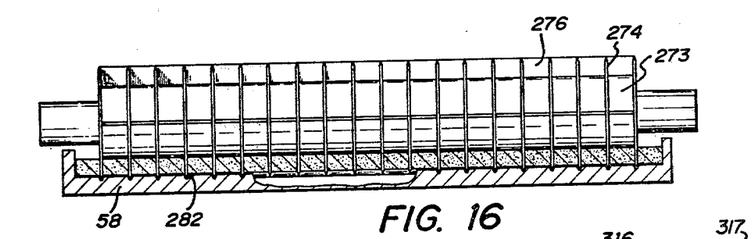
FIG. 16 is a sectional view taken along line 16—16 of the cutting device shown in FIG. 15.

FIG. 16 illustrates a cross-sectional view taken along a vertical plane through the longitudinal axis of cutting drum 272. In this embodiment of the invention, belt conveyor 58 is provided with a plurality of longitudinal indentions 282 corresponding to the cutting edges of the slicing disks 274 in order to facilitate the complete severing of the chilled pork sausage. Similarly, the conveyor surface may likewise be adapted with transverse indentions 284 corresponding to the longitudinal cutting blades 276 extending longitudinally along cutting drum 272 (FIG. 15). In this case, the rotation of the cutting drum must be synchronized with the movement of conveyor 58 in order that longitudinal blades 276 mate with transverse indentions 284.

Figure 17:
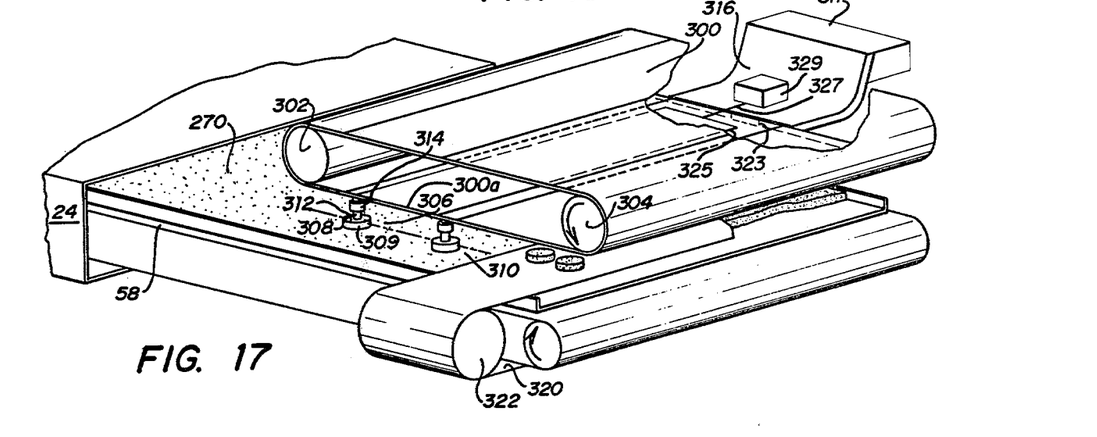
FIG. 17 is a perspective view of a third embodiment of a cutting device for forming preselected shapes of sausage products.

FIG. 17 illustrates another embodiment of the severing device used in the present invention. Again, a continuous sheet 270 of chilled sausage material is illustrated as it moves on conveyor 58 from freezer 24. The continuous sheet of chilled material is carried on conveyor 58 through a cutting station which includes a dual conveyor system for stamping discrete predetermined shapes of sausage material and carrying the severed shapes to an appropriate packaging station.

The first conveyor system includes an endless conveyor 300 entrained for continuous movement around drums 302 and 304 which are powered by an appropriate power means, such as an electric motor (not shown). Conveyor 300 has its longitudinal axis aligned with the longitudinal axis of material conveyor 58 and is positioned for rotation directly above conveyor 58, but having an opposite rotational direction. Conveyor 300 is adapted with a plurality of annular chambers extending the full width of the conveyor, such as chamber 300a, between its inner and outer surfaces. A plurality of stamping modules 306 extending perpendicularly from the outer surface of conveyor 300 and communicate with one of the annular chambers as hereinafter described.

Stamping modules 306 are adapted with a cutting configuration having a cylindrical or other desired shaped face 308 and corresponding cutting sidewall 309 extending therefrom to form a cup-like cutting unit 310. A tubular shaft 312 is connected to the outer surface of face 308 and is joined to conveyor 300 by way of an actuator valve 314 which is capable of extending the cutting module in response to a predetermined signal applied thereto. Tubular shaft 312 also communicates with one of the annular chambers between the inner and outer surfaces of conveyor 300. A second conveyor 320 is rotatable about motorized drums 322 and 324 (not shown). Conveyor 320 has its longitudinal axis transverse to the axes of conveyors 58 and 300 with its upper path of travel between conveyors 58 and 300.

Figure 18:
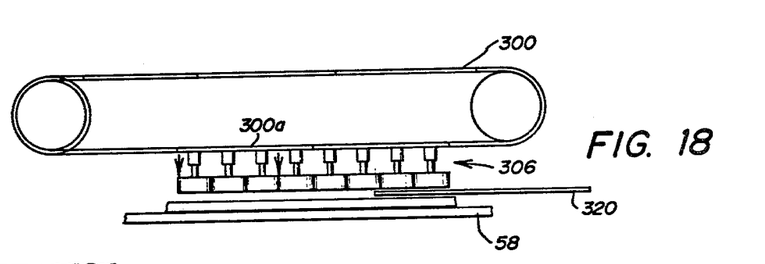
FIG. 18 is a sectional view taken along line 18—18 of the cutting device shown in FIG. 17.

FIG. 18 illustrates a cross-sectional view taken along the longitudinal axis of conveyor 320 and showing the relationship of the stamping modules 306 with respect to the material conveyor 58 and conveyor 320. In operation of the unit, belt conveyor 300 is moved at a rate of speed equal to the speed of travel of conveyor 58 on which the continuous sheet of chilled pork sausage is carried. A predetermined signal is applied to selected rows of actuator valves 314 attached to each of the cutting units 310 as conveyor 300 moves over a predetermined point of its course. While not so limited, the signal may be an electrical signal communicated to a selected number of rows of stamping modules 306 by way of electrical leads 325 pass an electrical connection 327 supplying electrical current from a power source 329.

Figure 19A:
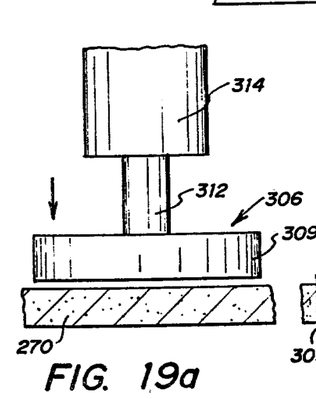
FIGS. 19a–19c illustrate the cutting operation of the cutting device shown in FIGS. 17 and 18.
Figure 19B:
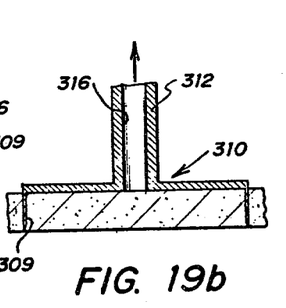
Figure 19C:
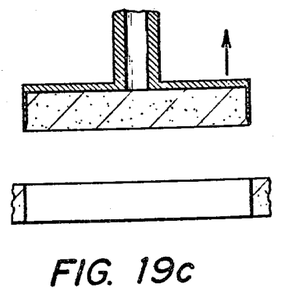

Referring to FIGS. 19a–19c, in response to the signal, tubular shaft 312 is extended, forcing the stamping module 306 against the chilled sausage material. The action of the cutting sidewall 309 against the chilled material results in the severence of a discrete portion of the material in the configuration defined by the cutting unit 310 (FIG. 19b). Simultaneously therewith, an opening 323 in annular chamber 300a moves into communication with a vacuum line 316 connected to an appropriate vacuum drawing system 317 for applying suction through each cutting unit 310 communicating with annular chamber 300a. This suction creates a vacuum to facilitate the withdrawal of the sausage material with the cutting unit. The cutting units 310 are withdrawn from the sheet of sausage (FIG. 19c) as conveyor 300 moves past the point at which the predetermined signal is communicated to actuator valves 314. It will be understood that the extension of the cutting units is carried out by simultaneously actuating a group of cutting units such that one area of the continuous sheet is stamped at one time. The cycle is repeated sequentially with respect to successive groups of units as they pass over the sheet of sausage material.

After withdrawal of the cutting units 310, the cutting units pass above transverse conveyor 320 which is continuously rotating therebelow. It will be noted that the cutting heads normal retracted position is a sufficient distance above material conveyor 58 such that the heads are above transverse conveyor 320 which passes above material conveyor 58. As the cutting units pass above transverse conveyor 320, annular chamber 300a moves out of communication with the vacuum source. Thus, the vacuum drawn above the severed material is removed and the discrete sausage products contained therein are ejected onto belt conveyor 320. It may be found benefical in some instances to apply air pressure against the back side of the severed material retained in the cutting units by applying a positive pressure through annular chamber 300a in order to assure the discharge of the discrete sausage products contained therein onto conveyor 320. The discharge of the discrete products onto the transverse conveyor 320 is accomplished without the interruption of the movement of the cutting units on conveyor 300. The cutting units continue to move about conveyor belt 300 and the process of stamping discrete sausage products from the continuous chilled material sheet 270 is continued on an uninterrupted basis.

It will be noticed that the cutting units 310 are closely positioned so as to minimize materials which are not severed in the stamping process. Where rectangular configurations are stamped from the continuous sheet of chilled material, the sausage material not cut by the stamping units will be minimized or eliminated altogether. Where a circular or other irregular design is desired, the sausage material not stamped by the cutting units 310 is recycled and fed back through extrusion manifold 20 (FIG. 1).

The discrete sausage products discharged onto conveyor 320 are carried on the conveyor to an appropriate packaging station where the products are packaged in desired quantities. It will be appreciated that in the above described embodiment, the severing and discharge steps are carried out without interrupting the movement of the cutter units on conveyor 300 or the conveyors 58 or 320.

As previously mentioned, although the present invention has been described with respect to preparing chilled pork sausage, it will be understood that the present apparatus and method may be utilized to produce a wide variety of products when it is desired to form a plurality of discrete products having the same weight, size and characteristics from a semi-fluid material.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for producing discrete products having a predetermined weight comprising:
    means for pumping a semi-fluid mixture along a distribution path;
    an extrusion manifold connected to receive said semi-fluid mixture and including means for extruding at a selected rate a sheet of mixture having a predetermined uniform cross-section;
    a chilling station;
    means for directing said continuous sheet through said chilling station in order to chill and firm said sheet such that said sheet maintains its extruded cross-sectional configuration;
    means for forming a plurality of discrete products having predetermined weights from said continuous sheet including a plurality of cutter units having a predetermined size and configuration and mounted for movement on an endless belt, said belt having chambers formed between the inner and outer walls thereof with a plurality of the cutter units in fluid communication with each chamber;
    means for systematically cutting said continuous sheet by selectively extending the cutter units outwardly from the endless belt and against said sheet to sever said sheet into discrete products conforming to the shape of said cutters and for withdrawing said cutters; and
    means for maintaining said discrete products within said cutters when said cutters are withdrawn by applying a suction to the cutter units through the chambers of said endless belt.

2. The system of claim 1 wherein said semi-fluid mixture comprises pre-rigor comminuted pork sausage.

3. The system of claim 1 wherein said extruding manifold comprises:
    a manifold housing having a centrally located inlet port for receiving the semi-fluid mixture and an outlet port for outputting predetermined portions of the received semi-fluid mixture,
    a flexible duct connected to said outlet port,
    a nozzle connected to the end of said duct defining the preselected shape of the extruded cross-sectional configuration, said nozzle being mounted on a housing along a horizontal line, and
    means for selectively raising and lowering said housing.

4. The system of claim 1 wherein said means for directing comprises:
    a linear conveyor for conveying said continuous sheet through said chilling station while maintaining the extruded cross-sectional configuration.

5. The system of claim 1 and further comprising:
    conveyor means underlying said cutter units, and
    means for aligning said cutter units over said conveyor means and for discharging said discrete products onto said conveyor means by communicating pressure against the discrete products through the chambers of the endless belt to the cutter units.

6. The system of claim 1 wherein each said cutter unit is characterized by a cylindrical wall having a flat bottom sealed across one edge of said cylindrical wall, the exposed edge of said wall being sharpened to function as the cutting edge of said cutter unit.

7. A method of producing discrete products having a selected weight comprising:
    forming a semi-fluid mixture of the product, pumping metered amounts of said mixture to an extrusion location, extruding said mixture into an elongated continuous sheet having a preselected uniform cross-section, directing said continuous sheet of said mixture through a chilling location while maintaining said preselected uniform cross-section to chill and firm the preselected cross-sectional shape of said lengths, and severing said continuous sheet into discrete products having the preselected weight by sequentially projecting a plurality of cutting molds against said continuous sheet and subsequently retracting the cutting molds away from the continuous sheet thereby stamping said continuous sheet to form said discrete products, each said mold moving on a continuous belt in synchronism with the continuous sheet and having a cutting edge for severing a predetermined shape from said continuous sheet.

8. The method of claim 7 and further comprising:

applying a suction through chambers in a continuous belt on which said molds are mounted and communicating the suction through a plurality of said molds to the severed products, withdrawing said molds with the severed product therein, aligning said molds with a conveyor means for carrying the severed product to a packaging station, and removing the suction from the chamber in the continuous belt and thereby from the severed product to disengage the product from said molds and deposit it on the conveyor means.

* * * * *

UNITED STATES PATENT AND TRADEMARK OFFICE
CERTIFICATE OF CORRECTION

PATENT NO. : 4,195,489
DATED : April 1, 1980
INVENTOR(S) : Vincent E. Bernard

It is certified that error appears in the above-identified patent and that said Letters Patent are hereby corrected as shown below:

References Cited: Podebradsky patent no. change "3,387,689" to --3,687,689--.
Column 9, line 6-7 change "rod bar" to --bar--.
Column 11, line 27 change "in weigh" to --to weigh--.
Column 12, line 23 change "extending" to --extend--.
Column 12, line 55 after "325" insert --as the leads--.

Signed and Sealed this

Twenty-second Day of July 1980

[SEAL]

Attest:

SIDNEY A. DIAMOND

Attesting Officer

Commissioner of Patents and Trademarks